US005943494A

United States Patent [19]
Golla et al.

[11] Patent Number: 5,943,494
[45] Date of Patent: Aug. 24, 1999

[54] METHOD AND SYSTEM FOR PROCESSING MULTIPLE BRANCH INSTRUCTIONS THAT WRITE TO COUNT AND LINK REGISTERS

[75] Inventors: Robert Thaddeus Golla; Christopher Hans Olson, both of Austin, Tex.

[73] Assignee: International Business Machines Corporation, Armonk, N.Y.

[21] Appl. No.: 08/486,304

[22] Filed: Jun. 7, 1995

[51] Int. Cl.[6] .................................................. G06F 9/42
[52] U.S. Cl. .................................. 395/585; 395/586
[58] Field of Search .................................. 395/584, 585, 395/586, 587

[56] References Cited

U.S. PATENT DOCUMENTS

| | | | |
|---|---|---|---|
| 4,833,599 | 5/1989 | Colwell et al. | 395/583 |
| 4,933,897 | 6/1990 | Shanker et al. | 395/557 |
| 5,167,026 | 11/1992 | Murray et al. | 395/386 |
| 5,276,882 | 1/1994 | Emma et al. | 395/587 |
| 5,317,720 | 5/1994 | Stamm et al. | 395/470 |
| 5,333,296 | 7/1994 | Bouchard et al. | 395/497.02 |
| 5,442,757 | 8/1995 | McFarland et al. | 395/394 |
| 5,454,117 | 9/1995 | Puziol et al. | 395/800.23 |
| 5,511,175 | 4/1996 | Favor et al. | 395/392 |
| 5,604,877 | 2/1997 | Hoyt et al. | 395/590 |
| 5,623,614 | 4/1997 | Van Dyke et al. | 395/587 |

FOREIGN PATENT DOCUMENTS

0605872A1 7/1994 European Pat. Off. .

OTHER PUBLICATIONS

Jerry M. Rosenberg; Dictionary of Computers, Information Processing & Telecommunications, 2nd Edition; 1990; p. 526.

Vol. 37, No. 4b, Apr. 1994, IBM Corporation, Armonk, NY.

Vol. 36, No. 12, Dec. 1993, IBM Corporation, Armonk, NY.

Vol. 34, No. 1, Jan. 1990, IBM Corporation, Armonk, NY.

IBM Technical Disclosure Bulletin, vol. 36, No. 1, Jan., 1993 pp. 135–136.

IBM Technical Disclosure Bulletin, vol. 36, No. 12, Dec., 1993 pp. 507–509.

IBM Technical Disclosure Bulletin, vol. 36, No. 1, Jun., 1986 pp. 357–359.

IBM Technical Disclosure Bulletin, vol. 14, No. 5, Oct., 1971 pp. 1381–1382.

*Primary Examiner*—Parshotam S. Lall
*Assistant Examiner*—Kenneth R. Coulter
*Attorney, Agent, or Firm*—Sawyer & Associates; Mark E. McBurney

[57] ABSTRACT

A system and method for processing count and link branch instructions that allows multiple branches to be outstanding at the same time without being limited to the number of rename registers allocated to the count and link registers. The method and system comprises an architected count register and an architected link register that are each connected to a look-ahead register. Information in the architected count or link register is copied into the look-ahead register when a branch instruction is encountered that will alter the contents of the count or link registers. Information in the look-ahead register is saved in a shadow register when an unresolved branch is encountered, and restored by the shadow register if the outcome of the unresolved branch is mispredicted.

6 Claims, 2 Drawing Sheets

METHOD AND SYSTEM FOR PROCESSING MULTIPLE BRANCH INSTRUCTIONS THAT WRITE TO COUNT AND LINK REGISTERS

FIELD OF THE INVENTION

The present invention relates to a method and system for improving the performance of a processor, and more particularly to a method and system for processing multiple branch instructions that write to count and link registers.

BACKGROUND OF THE INVENTION

Most personal computer (PC) architecture instruction sets include branch instructions. A branch instruction discontinues a program's execution along a sequential path and causes execution to resume at a new location in memory. The new location is referred to as the target address of the branch. In certain types of PC architectures, the target address for the instruction is stored in one of two architected registers referred to as count and link registers. Three types of branch instructions write to the count or link register; a branch-and-count, a branch-and-link, and a branch-to-link.

A branch-and-count is a branch that decrements the count register upon execution. A branch-and-count is useful for counter dependent loops, such as the statement "FOR i=1 to 100 DO," for example. This statement is executed by loading the count register with value "100" and decrementing the count register by one each time the branch executes until the count register reaches zero.

A branch-and-link is a branch that places the next sequential address following the branch instruction into the link register. A branch-to-link is a branch in which the target address is the value stored in the link register. The branch-and-link and branch-to-link instruction allow simple implementation of subroutine linkages.

After a branch instruction is executed, the contents of the count register or link register may be changed. The updating of the count and link registers creates what is called a write hazard. A write hazard exists when a register is written to and is then meant to be read by another entity, but is written to again before that read can occur. When the read eventually occurs, the register may not contain the correct value for that operation.

The execution of conditional branches is another way in which the contents of the count and link registers may be incorrectly changed. In a conditional branch, control is transferred to the target address depending upon the results of a previous instruction, such as a compare, for example. Conditional branches may be either resolved or unresolved branches depending on whether the result of the previous instruction is known at the time of the execution of the branch.

If the branch is resolved, then it is known whether the branch is to be executed. If the conditional branch is not executed, the next sequential instruction stream immediately following the branch instruction is executed. If the conditional branch is executed, then the instruction stream starting at the target address is executed.

Since it is unknown whether an unresolved branch is to be executed, it is also unknown which instruction stream should be processed. In order to prevent the processor from stalling pending resolution of the unresolved branch, some processors include mechanisms that attempt to predict the outcomes of unresolved branches. Until the outcome of condition is actually executed and the result becomes committed by the processor, the prediction is only speculative. The execution of the predicted instruction stream or path is therefore called speculative execution.

Because updating the count and link register with a speculative value may not be the correct value of the register, conventional processors do not change the architected value of the count and link registers when executing a conditional branch. To overcome write hazards and the potentially corruptive results of speculative execution, conventional processors assign several rename registers to both the count and link registers to backup the contents of the count and rename registers.

When the processor detects that an instruction will alter the contents of the count or link register (e.g., branch-and-count and branch-and-link), the processor saves the original contents of the register in a rename register. If the contents of the count or link register were changed incorrectly due to an incorrect speculative execution, for example, then the count or link register is restored with the value held in the rename register.

When a rename register is written to, it is associated with the instruction that changed the value of the count or link register. Once a rename register for the count or link register is associated with an instruction, the rename register cannot be freed until the instruction has been committed by the processor or an interrupt occurs. If another instruction alters the contents of the count or link register before the first rename register is deallocated, then the contents of the count or link register must be saved in a different rename register. Typically, four rename registers are assigned to the count and link register, respectively.

Although the use of rename registers is useful for restoring the contents of the count and link registers, they have several disadvantages. First, the use of rename registers causes the processor to stall when another branch instruction is encountered and there are no available rename registers to backup the count and link register contents. Therefore, the number of unresolved branches that may be processed without stalling is limited by the number of rename registers allocated to the count and link registers. This degrades processor performance.

In addition, rename registers require the use of a multiplexer when an instruction is encountered that attempts to read the contents of the count or link register. The multiplexer is required to associate the read instruction with the rename register containing the correct result of the count or link register for that particular instruction. Adding additional rename registers to the processor to prevent stalling only increases both the cost and complexity of the processor.

Accordingly, what is needed is a system and method for processing branch instructions that allows multiple branches to be outstanding at the same time and is not limited by the number of rename registers allocated to the count and link registers. The present invention addresses such a need.

SUMMARY OF THE INVENTION

The present invention provides a method and system for processing branch instructions that allows multiple branches to be outstanding at the same time, wherein a branch instruction alters the information in the branch register. The method and system copies information within the branch register into a look-ahead register when a branch instruction is encountered. When the branch instruction is unresolved, information within the look-ahead register is copied into a shadow register. If the unresolved branch instruction is mispredicted, information from the shadow register is then provided to the look-ahead register. When the branch instruction is fully executed, the method and system updates the information in the branch register.

According to the system and method disclosed herein, the present invention prevents processor stalls due to unresolved branches and eliminates the need for extra rename registers for the count and link registers. The present invention thereby increases overall processor performance while reducing processor cost and complexity.

DESCRIPTION OF THE INVENTION

The present invention relates to an improvement in processing multiple outstanding branch instructions. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
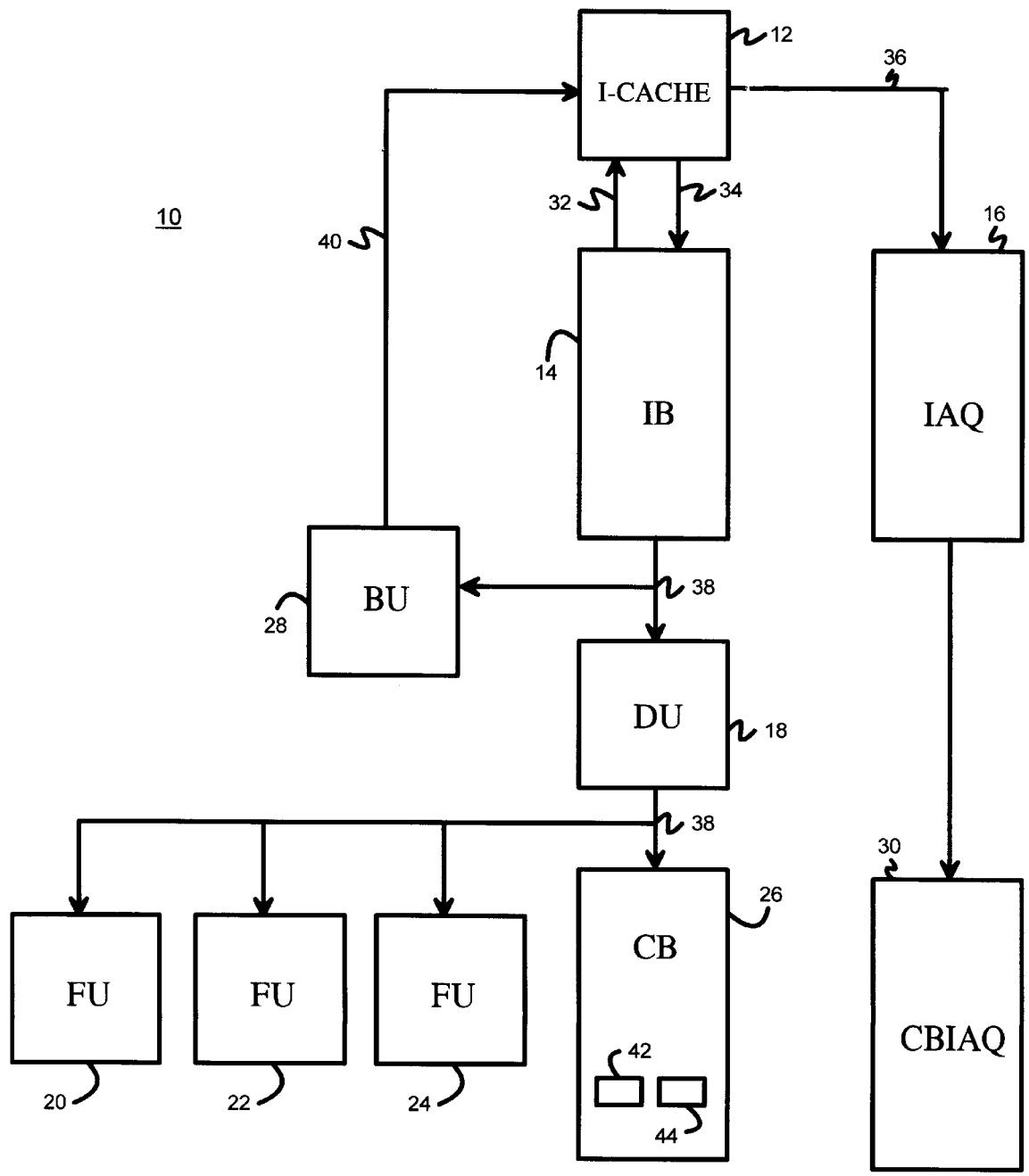
FIG. 1 is a block diagram of a processor in which the present invention resides.

FIG. 1 depicts a processor 10 in which the present invention resides. The processor 10 includes: an instruction cache (IC) 12, an instruction buffer (IB) 14, two instruction address queues (IAQs) 16 and 30, a dispatch unit (DU) 18, functional units (FUs) 20–24, a completion buffer (CB) 26, and a branch unit (BU) 28.

The processor 10 functions as follows. The instruction buffer 14 provides fetch addresses to the instruction cache 12 via address line 32, and the instructions pointed to by the fetch addresses are transferred out of the instruction cache 12 via data line 34 and placed into the instruction buffer 14. At the same time, the instruction cache 12 generates the addresses for the instructions and sends the addresses to the instruction address queue 16 via address line 36. The instruction address queue 16 is generally required in order to generate branch target addresses for relative branches.

Each cycle, the dispatch unit 18 evaluates instructions from the instruction S buffer 14 and dispatches non-branch instructions to the functional units 20–24 where they are queued for execution. At the same time, the branch unit 28 continually scans the instruction buffer 14 for branch instructions to process. The type of each instruction dispatched by the dispatch unit 18 is sent to the completion buffer 26 via instruction bus 38.

The completion buffer 26 keeps track of the outstanding dispatched instructions in the processor 10 and maintains the architectural state of the processor 10. As the instructions are dispatched by the dispatch unit 18, the addresses associated with the instructions are read into a second instruction address queue 30 assigned to the completion buffer 26, referred to here as the CB-IAQ 30. The completion buffer 26 uses the CB-IAQ 30 to save the correct address of faulting instructions.

The completion buffer 26 also controls the architected values of a count register 42 and a link register 44. For example, once an instruction, such as branch, reaches the bottom of the completion buffer 26, the instruction is fully executed. Fully executed instructions are committed by the completion buffer 26, at which time the values of architected registers are updated. In this example, the completion buffer 26 updates the architected count register by decrementing the value of the count register 42 by one.

The branch unit 28 processes branch instructions that specify a target address and supplies the target address to the instruction cache 12 over fetch address line 40, enabling the instruction cache 12 to process the new instruction stream the in next cycle. Some types of branches instructions utilize the count register 42 or the link register 44 in the formation of the target address. For example, a branch-and-link instruction must first have the target address calculated by one of the functional units 20–24, and then moved into the link register 44. In the case of a branch-to-link, the target address is read from the link register 42 and then sent to the instruction cache 12.

Figure 2:
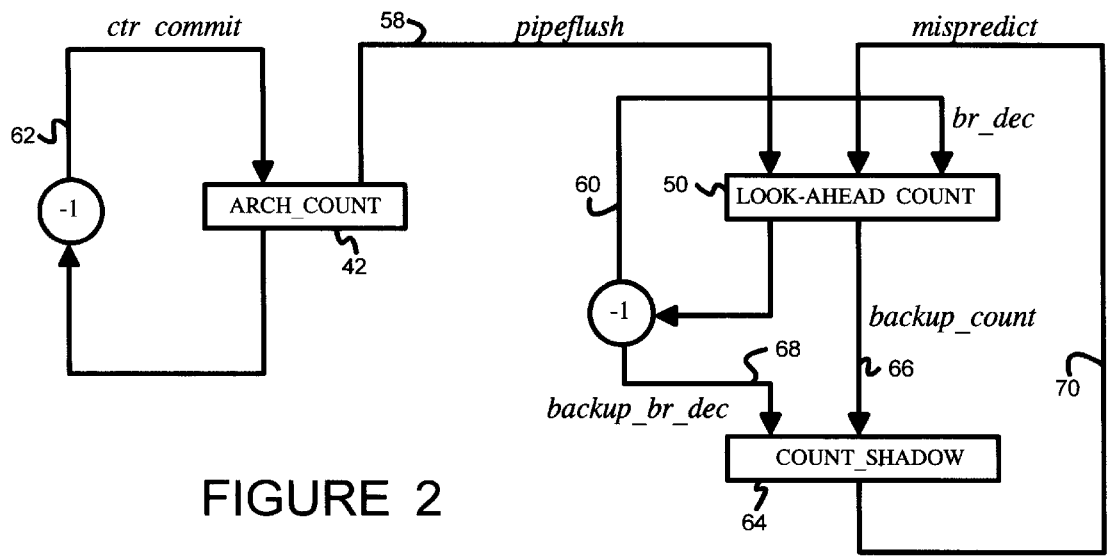
FIG. 2 is a diagram showing the dataflow between an architected count register and a look-ahead-count register of the present invention.
Figure 3:
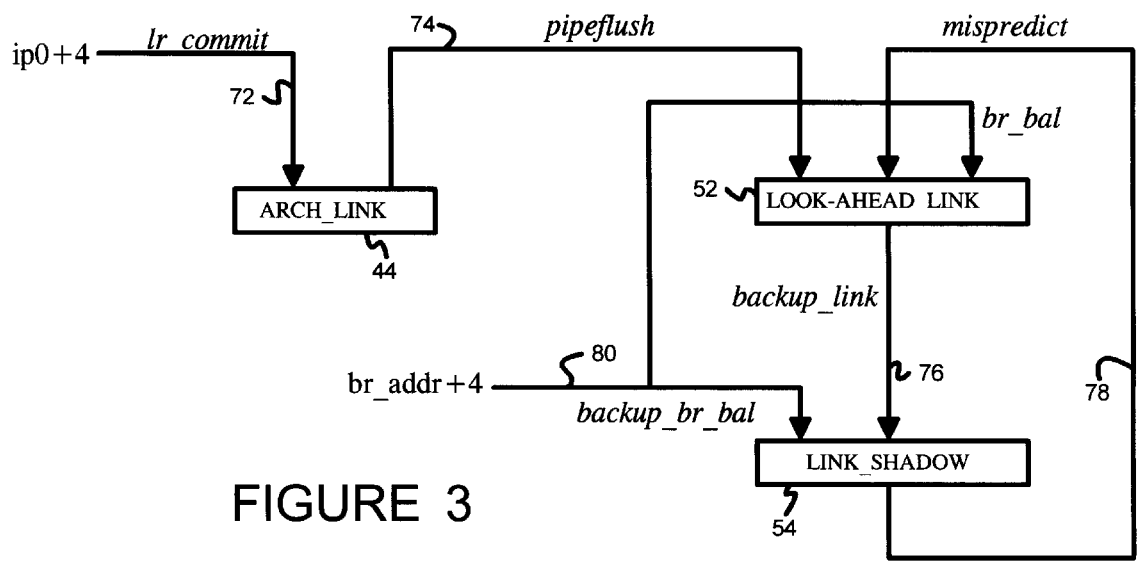
FIG. 3 is a diagram showing the dataflow between an architected link register and a look-ahead-link register of the present invention.

To more particularly illustrate the method and system for processing unresolved branches in accordance with the present invention, refer now to FIGS. 2 and 3 depicting one embodiment of such a system.

According to the present invention, the contents of the architected count register 42 and link register 44 are each saved in a register called a look-ahead register 50 and 52, respectively, as shown in FIGS. 2 and 3. As stated above, prior art methods, in contrast, save the architected register contents into a plurality of rename registers. In a preferred embodiment of the present invention, the look-ahead-count register 50 and the look-ahead-link register 52 are maintained by the branch unit 28 of FIG. 1.

FIG. 2 is a diagram showing the dataflow for processing multiple branch-and-count instructions between the architected count register 42 and the look-ahead-count register 50 of the present invention. As stated above, the architected count register 42 always contains the correct value of the count and cannot be overwritten by an interrupt. The contents of the architected count register 42 are copied into the look-ahead-count register 50 whenever a pipeflush signal 58, such as an interrupt, is generated by the processor 10. At this point the look-ahead-count register 50 and the architected count register 42 contain the same value.

When a branch-and-count is executed, a branch-decrement signal 60 is generated by the branch unit 28 causing the look-ahead-count register 50 to decrement by one (−1). When the branch-and-count instruction is committed by the completion buffer 26 (i.e. fully executed), a counter-commit signal 62 is generated indicating that the architected count register 42 may be updated. The counter-commit signal 62 causes the architected count register 42 to decrement by one (−1).

With respect to branch-and-count instructions, the look-ahead-count register. 50 of the present invention stores only the latest change of the architected count register 42. In contrast, the prior art use of rename registers unnecessarily stored every state change of the architected count register 42. For example, if the last four values of the architected count register 42 were "3," "2," "1," and "0," respectively, then the look-ahead-count register 50 would contain the value "0," whereas the prior art rename registers would contain all four values (assuming the rename registers were available). The present invention takes advantage of the fact that when the branch unit 28 encounters another branchand-count instruction, the branch unit 28 requires only the last value, not all four.

In addition, the present invention places no limits on the number of branch-and-count instructions that may be outstanding in the system at any given time, because the look-ahead-count register 50 is always available to accept the latest count value. Referring again to FIG. 1, the number of branch-and-count instructions that can be outstanding at any given time in conventional methods are limited by the number of rename registers allocated to the count register 42. The number of rename registers required to equal the performance of one look-ahead-count register 50 would equal the number of registers in instruction buffer 14 plus the number of registers in the completion buffer 26, which equals the total number of outstanding instructions in the system. For example, if the instruction buffer 14 and the completion buffer 26 both contain eight registers, then the use of one look-ahead-count register 50 by present invention eliminates the need for fifteen additional rename registers.

Referring again to FIG. 2, in order to process unresolved branch instructions, the present invention also includes a count-shadow register 64. The count-shadow register 64 is used to store the contents of the look-ahead-count register 50 when an unresolved branch is encountered. This is necessary since the outcome of the unresolved branch may be mispredicted, in which case the contents of the look-ahead-count register 50 would be corrupted.

When an unresolved branch is encountered, a backup-count signal 66 is generated and the contents of the look-ahead-count register 50 are copied into the count-shadow register 64. The content of the count-shadow register 64 is referred to as a snapshot since it is the state of the system before any speculative execution begins.

Additional branch instructions may be encountered during speculative execution. Any branch-and-count instructions encountered along the speculative path continue to generate a branch-decrement signal 60, causing the contents of the look-ahead-count register 50 to decrement by one.

If the unresolved branch itself is a branch-and-count instruction, then the branch unit 28 generates a backup-branch-decrement signal 68, causing the contents of the look-ahead-count register 50 to be decremented by one and saved in the count-shadow register 64.

Once the unresolved branch resolves, it is determined whether the outcome was predicted correctly by the system. If the outcome of the unresolved state is predicted correctly, then the contents of the look-ahead-count register 50 are correct and the count-shadow register 64 is freed to backup the look-ahead-count register 50 again. If the outcome of the unresolved state is mispredicted, then a mispredict signal 70 is generated and the count-shadow register 64 contents (the snapshot) are used to restore the look-ahead-count register 50 to the value that existed before the speculative execution.

In one embodiment, the present invention processes one unresolved branch at time. However, those with ordinary skill in the art will recognize that a count shadow register 64 may be added to handle each additional unresolved branch as required.

Referring now to FIG. 3, the dataflow for processing multiple branch-and-link instructions between the architected link register 44 and the look-ahead-link register 52 of the present invention is shown. The handling of multiple branch-and-link instructions is similar to the branch-and-count method described above.

The contents of the architected link register 44 are copied into the look-ahead-link register 52 whenever a pipeflush signal 58, such as an interrupt, is generated by the system. At this point the look-ahead-link register 52 and the architected link register 44 contain the same value.

When a branch-and-link instructions is subsequently encountered, four is added to the branch address and the result is saved in the look-ahead-link register 52. In order to process unresolved branch instructions that utilize the architected link register 44, the present invention also includes a link-shadow register 54. The link-shadow register 54 is used to store the contents of the look-ahead-link register 52 when an unresolved branch is encountered. This is necessary since the outcome of the unresolved branch may be mispredicted, in which case the contents of the look-ahead-link register 52 would be corrupted.

If the branch-and-link instruction is unresolved, then a backup-branch-and-link signal is generated causing four to be added to the branch address and the result stored in both the look-ahead-link register 52 and the link-shadow register 54.

Additional branch-and-link instructions maybe encountered during speculative execution. Any unresolved branch-and-link instruction encountered along the speculative path generates a backup-link signal 76, causing the contents of the look-ahead-link register 52 to be copied into the link-shadow register 64. Once the unresolved branch resolves, it is determined whether the outcome was predicted correctly by the system.

If the outcome of the unresolved branch is predicted correctly, then the contents of the look-ahead-link register 52 are correct and the link-shadow register 54 is freed to backup the look-ahead-link register 52 again. If the outcome of the unresolved branch is mispredicted, then a mispredict signal 78 is generated and the link-shadow register 54 contents (the snapshot) are used to restore the look-ahead-link register 52 to the value that existed before the speculative execution.

When a link instruction is committed by the completion buffer 26 (see FIG. 1), a link-commit signal 72 is generated. The completion buffer 26 updates the architected link register 44 by adding four to the corresponding address for the current instruction (IP0), which is contained in the CD-IAQ 30, and saving the result in the architected link register 44.

A method and system has been disclosed for processing multiple branches that write to count and link registers. The branch method and system disclosed herein allows multiple branch instructions to be outstanding at the same time without requiring a plurality of rename registers for support. The present invention therefore increases overall system performance by reducing the number of processor stalls due to limitations on how many branch instructions may be outstanding. Additionally, the present invention reduces the number of registers in the system since a plurality of rename registers is no longer required, thereby reducing the complexity and cost of the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing branch instructions that allows multiple branch instructions to be outstanding at the same time, wherein a branch instruction alters information within a branch register, the method comprising the steps of:

copying the information within the branch register into a single look-ahead register when a branch instruction is encountered;

decrementing by one information in the single look-ahead register upon execution of a branch-and-count instruction;

copying information within the single look-ahead register into a single shadow register when the branch instruction is unresolved, wherein the step of copying information in the single look-ahead register into a single shadow register further includes the step of decrementing by one the information in the single look-ahead register before copying the information into the single shadow register if the unresolved branch instruction is a branch-and-count instruction;

providing information from the single shadow register to the single look-ahead register if the unresolved branch instruction is mispredicted; and updating the information in the branch register when the branch instruction is fully executed.

2. A method as in claim 1 wherein the branch register is an architected count register.

3. A method for processing branch instructions that allows multiple branch instructions to be outstanding at the same time, wherein a branch instruction alters information within a branch register, the method comprising the steps of:

copying the information within the branch register into a single look-ahead register when a branch instruction is encountered;

copying information within the single look-ahead register into a single shadow register when the branch instruction is unresolved, wherein when the unresolved branch instruction is a branch-and-link instruction, the method further includes the steps of:

adding four to a branch address to create a new branch address; and storing the new branch address in the single shadow register;

providing information from the single shadow register to the single look-ahead register if the unresolved branch instruction is mispredicted; and updating the information in the branch register when the branch instruction is fully executed, including adding four to a current instruction address to create a link address, and storing the link address in the branch register.

4. A method as in claim 3 wherein the branch register is an architected link register.

5. A system for processing multiple branch instructions that modify architected register data during execution comprising;

a dispatch unit for dispatching instructions;

a completion buffer connected to the dispatch unit having a branch register for storing branch instruction data;

a branch unit connected to the dispatch unit for executing different types of branch instructions; and look-ahead register means maintained by the branch unit for backing-up the data stored in the branch register, the look-ahead register means including a first register and a second register, the second register restoring the data stored in the first register when the data becomes corrupted, and the first register saving the data into the second register when the branch unit executes an unresolved branch instruction, wherein the second register copies data back into said first register when the unresolved branch instruction has been mispredicted.

6. A system for processing multiple branch instructions that modify architected register data during execution, the system allowing multiple branches to be outstanding at the same time without being limited to how many rename registers are allocated to a count register and to a link register, the system comprising:

a dispatch unit for dispatching instructions;

a completion buffer connected to the dispatch unit having a branch register for storing branch instruction data;

a branch unit connected to the dispatch unit for executing different types of branch instructions; and look-ahead register means maintained by the branch unit for backing-up the data stored in the branch register, the look-ahead register means including a first register, a second register, means for decrementing the data by one each time a first type of branch instruction is executed, and means for restoring the data stored in the look-ahead register means when the data becomes corrupted, the first register saving the data into the second register when the branch unit executes an unresolved branch instruction, and the second register copying data back into said first register when the unresolved branch instruction has been mispredicted, wherein the first register is a look-ahead register and the second register is a shadow register.

* * * * *